US012472660B2

(12) United States Patent
Cheung et al.

(10) Patent No.: US 12,472,660 B2
(45) Date of Patent: Nov. 18, 2025

(54) AUTOMATED CONCRETE CUBE PROCESSING SYSTEM

(71) Applicant: Logistics and Supply Chain MultiTech R&D Centre Limited, Hong Kong (HK)

(72) Inventors: Chi Wing Cheung, Hong Kong (HK); Wang Fei Ng, Hong Kong (HK); King Sau Wong, Hong Kong (HK); Lok Shing Leung, Hong Kong (HK); Ching Yuen Chan, Hong Kong (HK)

(73) Assignee: Logistics and Supply Chain MultiTech R&D Centre Limited, Hong Kong (HK)

( * ) Notice: Subject to any disclaimer, the term of this patent is extended or adjusted under 35 U.S.C. 154(b) by 230 days.

(21) Appl. No.: 18/177,894

(22) Filed: Mar. 3, 2023

(65) Prior Publication Data

US 2024/0293957 A1 Sep. 5, 2024

(51) Int. Cl.
*B28B 15/00* (2006.01)
*B28B 11/24* (2006.01)
*B28B 17/00* (2006.01)

(52) U.S. Cl.
CPC ............ *B28B 15/00* (2013.01); *B28B 11/243* (2013.01); *B28B 11/245* (2013.01); *B28B 17/0072* (2013.01)

(58) Field of Classification Search
CPC . B28B 11/243; B28B 11/245; B28B 17/0072; B28B 17/0063; B28B 17/0081; B28B 7/0094
See application file for complete search history.

(56) References Cited

U.S. PATENT DOCUMENTS 2,647,295 A * 8/1953 Gould ..................... B28B 11/00 425/436 R
3,139,663 A * 7/1964 Boswell .................... B28B 5/04 425/432
3,412,878 A * 11/1968 Todd ...................... B65G 17/06 414/152
3,982,890 A * 9/1976 Lovell ....................... F27B 9/16 34/217
5,391,245 A * 2/1995 Turner .................... B28B 11/24 156/39
5,997,779 A * 12/1999 Potter ...................... G01K 1/02 156/39
6,045,730 A * 4/2000 Potter ..................... C04B 40/02 156/39

(Continued)

*Primary Examiner* — Andrew D Graham
(74) *Attorney, Agent, or Firm* — KPIP Law, PLLC; Kimberly AW Peaslee

(57) ABSTRACT

An automated concrete cube processing system. The system comprises a curing stage including a water tank arranged to facilitate curing of a plurality of concrete cubes for a predetermined period of time; a drying stage arranged to facilitate drying of the plurality of concrete cubes upon completion of curing process; a measurement stage arranged to facilitate measuring of dimensions and a weight of each of the plurality of concrete cubes; a compression stage arranged to facilitate undertaking of a compressive strength test on each of the plurality of concrete cubes; and a transportation module arranged to transfer the plurality of concrete cubes among different stages.

16 Claims, 10 Drawing Sheets

(56) References Cited

U.S. PATENT DOCUMENTS

| | | | | |
|---|---|---|---|---|
| 6,383,420 | B1 * | 5/2002 | Mohr | B28B 15/00 264/234 |
| 6,418,638 | B1 * | 7/2002 | Forster | B28B 11/24 156/39 |
| 7,438,757 | B2 * | 10/2008 | Williams | E04B 2/14 524/4 |
| 7,708,933 | B2 * | 5/2010 | Kasai | C04B 37/005 264/630 |
| 10,443,206 | B2 * | 10/2019 | O'Neill | B28B 7/0061 |
| 2005/0082705 | A1 * | 4/2005 | Adriaansen | B28B 13/04 425/173 |
| 2008/0106008 | A1 * | 5/2008 | Kasai | C04B 35/565 34/442 |
| 2011/0048287 | A1 * | 3/2011 | Alhozaimy | B28B 11/245 106/737 |
| 2011/0270572 | A1 * | 11/2011 | Schoonover | G01N 33/383 702/156 |
| 2011/0278753 | A1 * | 11/2011 | Breuer | B29C 48/92 356/608 |
| 2012/0082839 | A1 * | 4/2012 | Ha | C04B 16/04 428/221 |
| 2012/0133065 | A1 * | 5/2012 | Caffrey | B28B 3/20 425/143 |
| 2012/0164259 | A1 * | 6/2012 | Collison | B28B 17/009 425/258 |
| 2012/0292822 | A1 * | 11/2012 | Flynn | B28B 7/0094 249/121 |
| 2014/0120202 | A1 * | 5/2014 | Manni | B28B 15/002 425/432 |
| 2014/0159265 | A1 * | 6/2014 | Maurer | B28B 17/0072 264/40.1 |
| 2014/0245691 | A1 * | 9/2014 | Molinelli | B28B 7/0055 52/582.1 |
| 2015/0246460 | A1 * | 9/2015 | Schlusselbauer | B28B 17/0063 425/88 |
| 2016/0250780 | A1 * | 9/2016 | Easton | B01F 27/118 264/334 |
| 2018/0194693 | A1 * | 7/2018 | Quinn | B28B 11/243 |
| 2018/0236690 | A1 * | 8/2018 | Saindon | B28B 17/0072 |
| 2019/0176362 | A1 * | 6/2019 | Malarkey | B28B 17/0081 |
| 2019/0184601 | A1 * | 6/2019 | Ley | B28B 23/0031 |
| 2020/0001537 | A1 * | 1/2020 | Zamorano | B33Y 50/02 |
| 2020/0062660 | A1 * | 2/2020 | Tas | C04B 28/02 |
| 2020/0331814 | A1 * | 10/2020 | Barry | C04B 41/009 |
| 2022/0388915 | A1 * | 12/2022 | Shao | B28B 11/243 |

* cited by examiner

AUTOMATED CONCRETE CUBE PROCESSING SYSTEM

TECHNICAL FIELD

The invention relates to an automated concrete cube processing system, and particularly, although not exclusively, to an automated concrete cube processing system for curing, measuring and testing sample concrete cubes.

BACKGROUND

Concrete cube testing may be processed by performing a manual operated procedure. For example, the manual operated procedure may include: cube dimension measurement, cube weight measurement, store cube in water tank for 28 days and compression test. All of the above processes are manual operation, and thus human errors may occur during the manual operation. A fully automatic concrete cube testing was proposed to the cube testing operation.

SUMMARY OF THE INVENTION

In accordance with a first aspect of the present invention, there is provided an automated concrete cube processing system comprising: a curing stage including a water tank arranged to facilitate curing of a plurality of concrete cubes for a predetermined period of time; a drying stage arranged to facilitate drying of the plurality of concrete cubes upon completion of curing process; a measurement stage arranged to facilitate measuring of dimensions and a weight of each of the plurality of concrete cubes; a compression stage arranged to facilitate undertaking of a compressive strength test on each of the plurality of concrete cubes; and a transportation module arranged to transfer the plurality of concrete cubes among different stages.

In accordance with the first aspect, the transportation module comprises a plurality of cube trays each arranged to hold a plurality of concrete cubes for batch processing of the concrete cubes in the curing stage.

In accordance with the first aspect, the plurality of cube trays are arranged in a two-dimensional array in the water tank to facilitate batch processing of the concrete cubes in the curing stage.

In accordance with the first aspect, the transportation module further comprises a precision hanger arranged to move the plurality of cube trays to a predetermined position in the two-dimensional array.

In accordance with the first aspect, the transportation module further comprises a plurality of anchoring heads each provided with an anchoring mechanism arranged to selectively hold a respective cube tray during transportation of the plurality of concrete cubes.

In accordance with the first aspect, the plurality of anchoring heads are arranged to work under water.

In accordance with the first aspect, the plurality of cube trays are made of stainless steel.

In accordance with the first aspect, the transportation module further comprises a robotic arm arranged to remove the plurality of concrete cubes from a tray compartment in the cube tray, and to move the plurality of concrete cubes among different stages.

In accordance with the first aspect, the robotic arm includes 6-axis robot arm.

In accordance with the first aspect, the robotic arm is mounted on a rail system arranged to facilitate transportation of the concrete cube held by the robotic arm along a predetermined path among different stages.

In accordance with the first aspect, the robotic arm comprises a mechanical gripper arranged to selectively hold the plurality of concrete cubes.

In accordance with the first aspect, the measurement stage comprises a 3D measurement device arranged to measure the size of the concrete cube.

In accordance with the first aspect, the measurement stage further comprises an electric weight scale arranged to measure the weight of the concrete cube.

In accordance with the first aspect, the compression stage comprises a concrete testing machine arranged to perform a compressive strength test on the concrete cube.

In accordance with the first aspect, the drying stage comprises an air blower arranged to facilitate removal of water from the plurality of concrete cubes after the completion of curing process.

In accordance with the first aspect, the system further comprises a data storage arranged to store testing and measurement records associated with each of the plurality of concrete cubes being processed.

In accordance with the first aspect, the system further comprises an input stage arranged to receive the plurality of concrete cubes being processed.

In accordance with the first aspect, the input stage comprises an RFID reader arranged to read a tag provided with an ID of the concrete cube being processed.

In accordance with the first aspect, the system further comprises a concrete cube failure checking module arranged to detect a defect in the plurality of concrete cubes being processed.

In accordance with the first aspect, the concrete cube failure checking module includes a deep-learning based concrete analyzer.

In accordance with the second aspect of the present invention, there is provided a method for processing concrete cube, comprising the steps of: curing a plurality of concrete cubes for a predetermined period of time at a curing stage including a water tank; drying the plurality of concrete cubes upon completion of curing process at a drying stage; measuring of dimensions and a weight of each of the plurality of concrete cubes at a measurement stage; undertaking a compressive strength test on each of the plurality of concrete cubes at a compression stage; and transferring, by using a transportation module, the plurality of concrete cubes among different stages.

In accordance with the second aspect, the transportation module comprising a plurality of cube trays each arranged to hold a plurality of concrete cubes for batch processing of the concrete cubes in the curing stage.

In accordance with the second aspect, the method further comprising the step of arranging the plurality of cube trays in a two-dimensional array in the water tank to facilitate batch processing of the concrete cubes in the curing stage.

In accordance with the second aspect, moving the plurality of cube trays, by using a precision hanger of the transportation module, to a predetermined position in the two-dimensional array.

In accordance with the second aspect, the transportation module further comprises a plurality of anchoring heads each provided with an anchoring mechanism arranged to selectively hold a respective cube tray during transportation of the plurality of concrete cubes.

In accordance with the second aspect, the plurality of anchoring heads are arranged to work under water.

In accordance with the second aspect, the plurality of cube trays are made of stainless steel.

In accordance with the second aspect, removing, by using a robotic arm of the transportation module, the plurality of concrete cubes from a tray compartment in the cube tray, and to move the plurality of concrete cubes among different stages.

In accordance with the second aspect, the robotic arm includes 6-axis robot arm.

In accordance with the second aspect, the robotic arm is mounted on a rail system arranged to facilitate transportation of the concrete cube held by the robotic arm along a predetermined path among different stages.

In accordance with the second aspect, the robotic arm comprises a mechanical gripper arranged to selectively hold the plurality of concrete cubes.

In accordance with the second aspect, the measurement stage comprises a 3D measurement device arranged to measure the size of the concrete cube.

In accordance with the second aspect, the measurement stage further comprises an electric weight scale arranged to measure the weight of the concrete cube.

In accordance with the second aspect, the method further comprises the step of performing a compressive strength test on the concrete cube using a concrete testing machine at the compression stage.

In accordance with the second aspect, the method comprises the step of using an air blower at the drying stage to remove water from the plurality of concrete cubes after the completion of curing process.

In accordance with the second aspect, storing testing and measurement records associated with each of the plurality of concrete cubes being processed.

In accordance with the second aspect, the method further comprises the step of receiving the plurality of concrete cubes being processed at an input stage.

In accordance with the second aspect, the method further comprises the step of reading, using an RFID reader at the input stage, a tag provided with an ID of the concrete cube being processed.

In accordance with the second aspect, the method further comprises the step of detecting a defect in the plurality of concrete cubes being processed using a concrete cube failure checking module.

In accordance with the second aspect, the concrete cube failure checking module includes a deep-learning based concrete analyzer.

BRIEF DESCRIPTION OF THE DRAWINGS

Embodiments of the present invention will now be described, by way of example, with reference to the accompanying drawings in which.

DETAILED DESCRIPTION OF THE PREFERRED EMBODIMENTS

Figure 1:
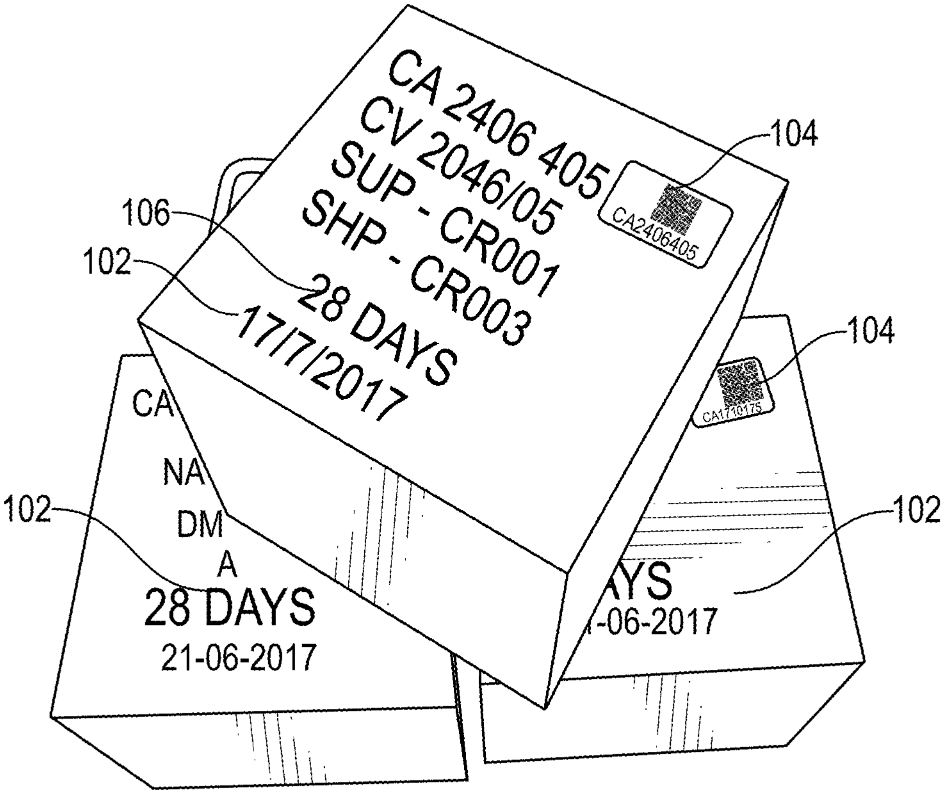
FIG. 1 is an image of a plurality of concrete cubes which may be processed by an automated concrete cube processing system in accordance with embodiments of the present invention.

With reference to FIG. 1, there is shown a number of concrete blocks/cubes 102 which may be delivered to a testing lab for evaluation. In this example, each of the blocks 102 has a dimension of 100 mm×100 mm×100 mm, with a label 104 applied on a surface of the block 102 provided with barcodes or QR codes embedded with an ID for identifying the block from other blocks in the testing lab. These concrete blocks 102 may be made by on-site at a construction site, which are then collected by contractors, and later delivered to the testing lab without completing the curing process. Sometimes, manually written labels 106 may be drawn on a surface of the collected concrete blocks 102 to show additional information related to the site or the concrete block 102 itself.

Without wishing to be bound by theory, concrete curing is the process of maintaining adequate moisture in concrete within a proper temperature range in order to aid cement hydration at early ages. In particular, hydration is the chemical reaction between cement and water that results in the formation of various chemicals contributing to setting and hardening.

Curing plays an important role on strength development and durability of concrete. Curing takes place immediately after concrete placing and finishing, and involves maintenance of desired moisture and temperature conditions, both at depth and near the surface, for extended periods of time. Properly cured concrete has an adequate amount of moisture for continued hydration and development of strength, volume stability, resistance to freezing and thawing, and abrasion and scaling resistance.

In addition, it may take a long time to complete curing of a concrete block in different stages, to achieve desire hardness and mechanical stiffness. For example, it may take around 24 to 48 hours in which the concrete slab is set initially so it can be manipulated, e.g. people can walk on such a concrete surface, after around 7 days, the concrete surface may support even vehicles or heavy equipment, as the concrete increases in strength very quickly for a period of 3-7 days. In some examples, concrete which is moist cured for 7 days may be about 50% stronger than uncured concrete. Finally, after around 28 days, the created concrete should be fully cured.

The inventors devised that, if there is no automate machine for measuring the cube, no automate input testing result from the compressive strength testing machine, the concrete cube after 28 days would need to be manually handled in the concrete testing process since there is no fully automated system for processing the concrete blocks to be tested.

Figure 2:
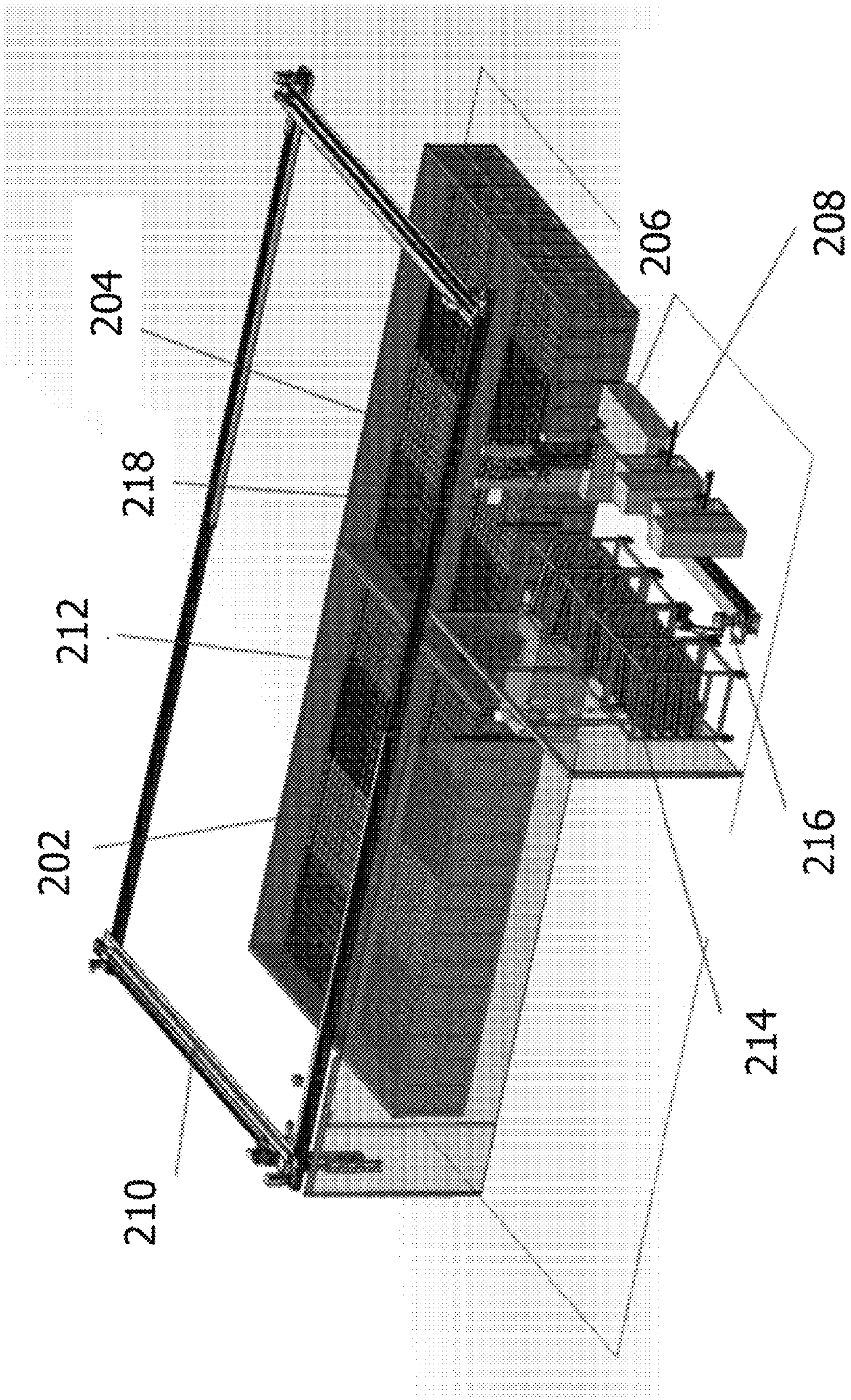
FIG. 2 is an illustration of an automated concrete cube processing system in accordance with an embodiment of the present invention.

With reference to FIG. 2, there is shown an embodiment of an automated concrete cube processing system 200 comprising: a curing stage including a water tank 202 arranged to facilitate curing of a plurality of concrete cubes 102 for a predetermined period of time; a drying stage 204 arranged to facilitate drying of the plurality of concrete cubes 102 upon completion of curing process; a measurement stage 206 arranged to facilitate measuring of dimensions and a weight of each of the plurality of concrete cubes 102; a compression stage 208 arranged to facilitate undertaking of a compressive strength test on each of the plurality of concrete cubes 102; and a transportation module arranged to transfer the plurality of concrete cubes 102 among different stages.

In this embodiment, the automated concrete cube processing system 200 comprises multiple automated processing stages and equipment that performs all necessary tasks involved in concrete curing and testing of the block samples 102 delivered to the system 200, such that human intervention or manual processes may be reduced significantly.

The inventors devised that it is preferable to provide an automated system 200 for concrete cube testing. Preferably, the system 200 may carry out automated concrete cube curing and compression testing on 100 mm concrete cube samples in accordance with the requirements of construction standard CS1:1990 and CS1:2010.

For example, referring to FIG. 2, the automatic concrete cube test system 200 may include an automatic precision moving hanger, water tanks, cube input table, air blowers, dimension and digital weight scale measurement station, compression test machines, robot arm and cube storage shelves. The moving hanger can automatically pick up a metal tray with maximum of 6 pcs of concrete cube storage space and transfer the metal tray to the water tank. The metal tray will stay in the water tank for curing process.

When the curing is complete, e.g. after 28 days as described earlier, the moving hanger then picks up the metal tray and passes through an air blower to remove the water on cube surface. Then the moving hanger may put it on a robot arm pick up station. The robot arm will pick up one concrete cube from metal tray. The concrete cube will be placed on a 3D measurement device to measure the size of the concrete cube. Then the robot arm picks up the concrete cube and places it on an electric weight scale to measure the weight of the concrete cube. Then the robot arm picks up the cube and places it on compression test machine. The testing result will be sent to a computer server to store the data in a database. After finishing the testing, robot arm picks up the cube and places it on a cube storage shelf.

Figure 3:
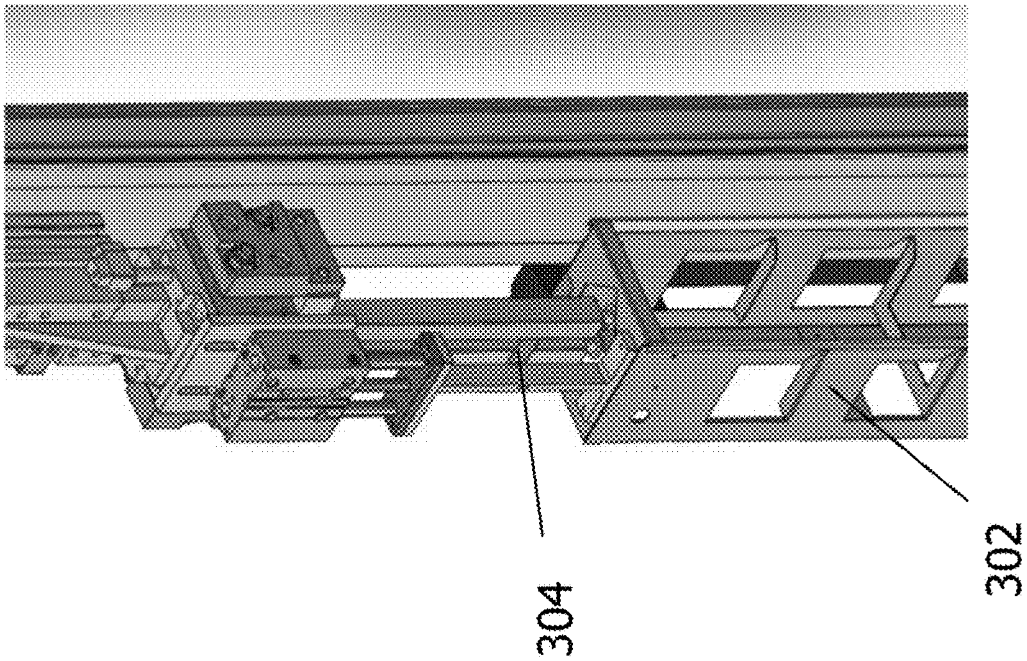
FIG. 3 is an illustration of an anchoring head of the hanger in the transportation module in the automated concrete cube processing system of FIG. 2.
Figure 4:
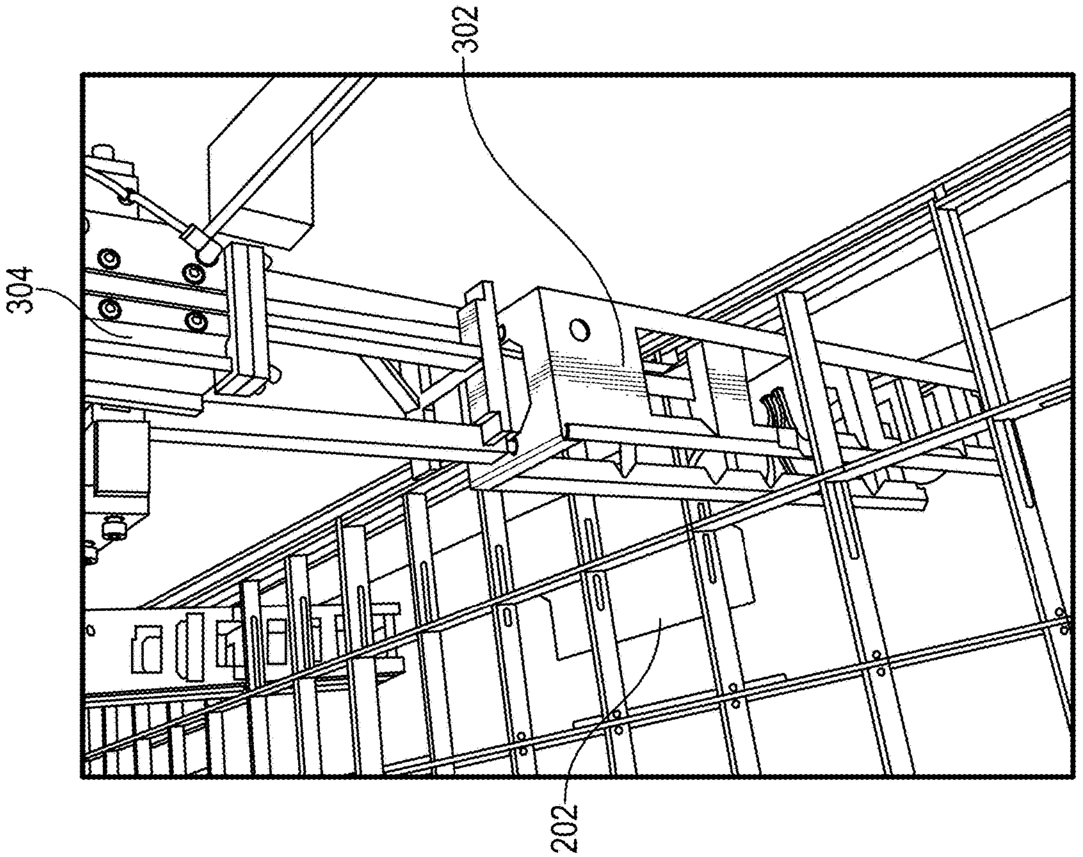
FIG. 4 is an image of an anchoring head of FIG. 3 operated to place a cube tray in a predetermined position in a 2D array in the water tank of the automated concrete cube processing system.
Figure 5:
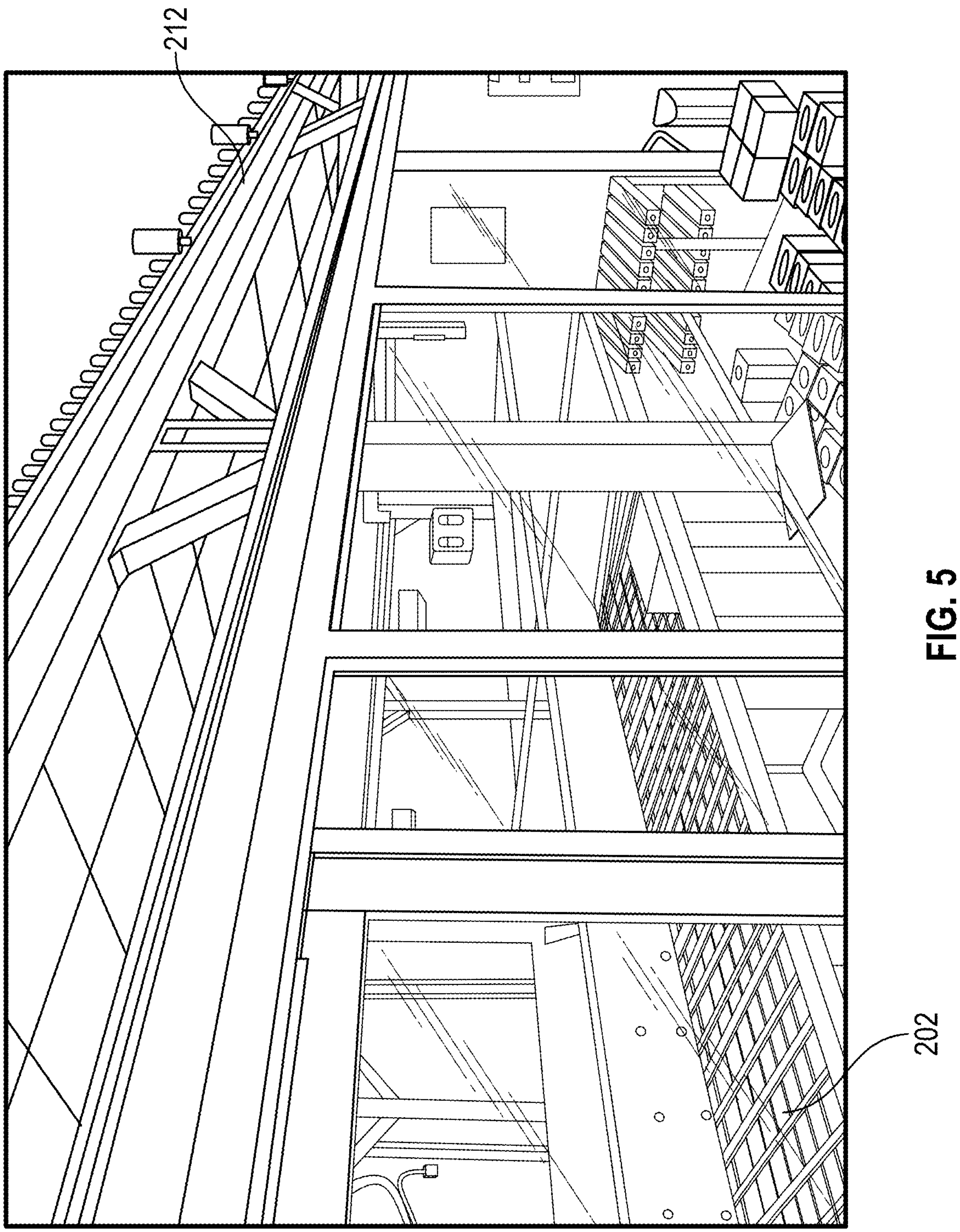
FIG. 5 is an image showing the water tank of FIG. 4.

With reference also to FIGS. 3 to 5, the transportation module comprising a plurality of cube trays 302 each arranged to hold a plurality of concrete cubes 120 for batch processing of the concrete cubes 102 in the curing stage, and the plurality of cube trays 102 are arranged in a two-dimensional array in the water tank 202 to facilitate batch processing of the concrete cubes 102 in the curing stage. As earlier described, a metal tray 302, which may be made of stainless steel or other corrosion-resistance material, may be used for holding a maximum number of 6 pieces, e.g. in a 2×3 array arranged vertically, and the water tank 202 is large enough to accommodate an array of metal trays 302 arranged horizontally, so that a large number of concrete blocks 102 may be processed simultaneously. For example, the water tank 202 may have a capacity to accommodate 6000 concrete blocks to facilitate curing of these blocks before measurement and/or testing.

Preferably, the transportation module further comprises a precision hanger 210 arranged to move the plurality of cube trays 302 to a predetermined position in the two-dimensional array, and the transportation module may further comprise a plurality of anchoring heads 304 each provided with an anchoring mechanism arranged to selectively hold a respective cube tray 302 during transportation of the plurality of concrete cubes 102.

The inventors named the transportation module as a "Grab & GO Mechanism", in which the anchoring mechanism operates to grab the cube tray 302 from an input stage 212 arranged to receive the plurality of concrete cubes 102 being processed, and then a precision hanger 210 of the transportation module may be used to move the plurality of cube trays 302 to a predetermined position in the two-dimensional array, i.e. the water tank 202. Preferably, the anchoring head 304 is water resistance and is operable under water.

After the concrete blocks 102 are immersed in the curing tank 202, e.g. by lowering the cube tray 302 via the anchoring system 200 from the overhead level to the tank, the cube tray is left in the water tank 202 and the hanger/anchor may be detached from the cube tray 302, and the hanger may be used in transporting other cube trays 302. Similarly, the curing process of certain set of concrete blocks is completed, the entire tray 302 may be lifted by the precision hanger 210 from the water tank 202, which may be transported to other stages for further processing, via the same anchoring mechanism 304.

Figure 6:
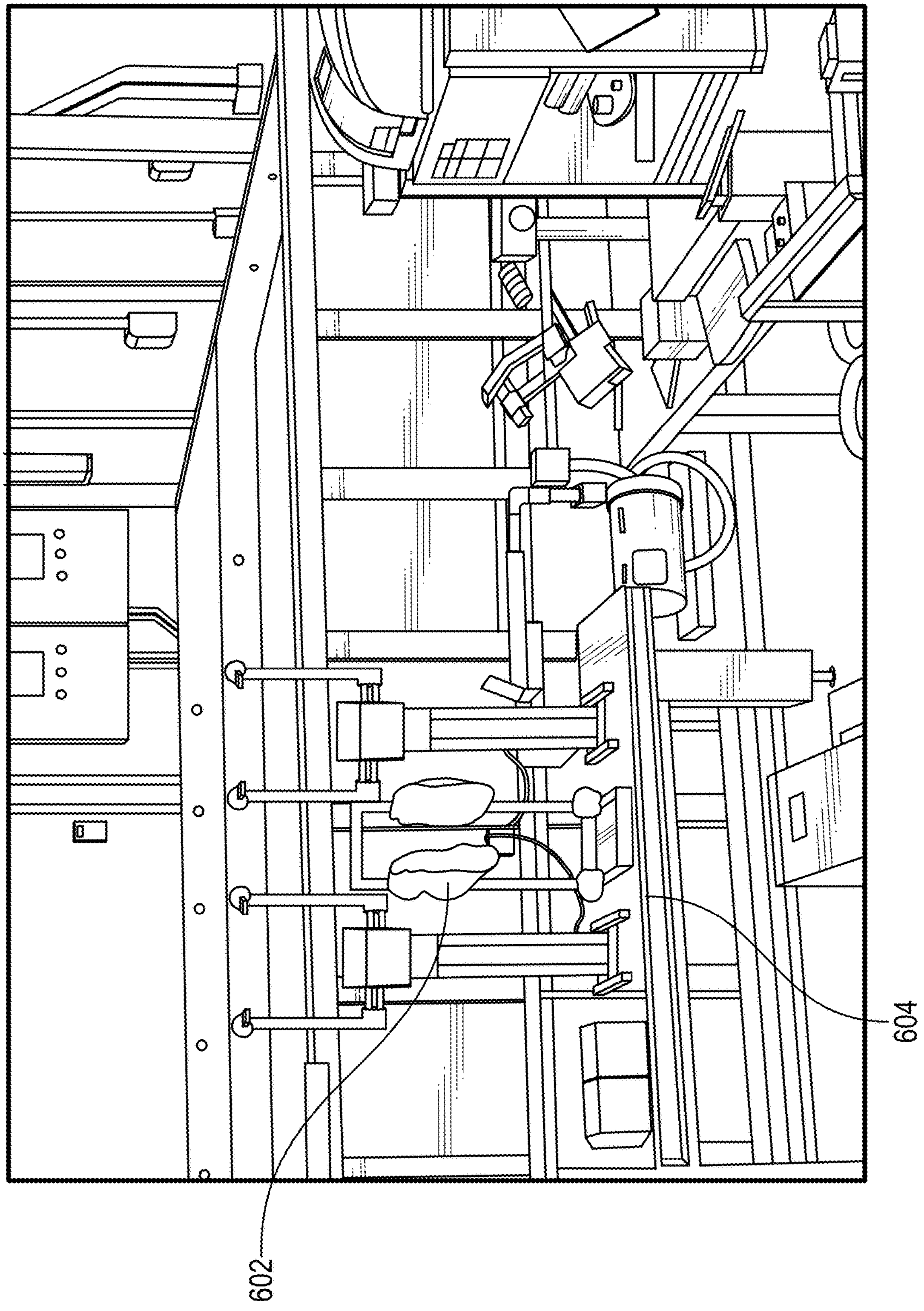
FIG. 6 is an image showing a drying stage of the automated concrete cube processing system of FIG. 2.
Figure 8:
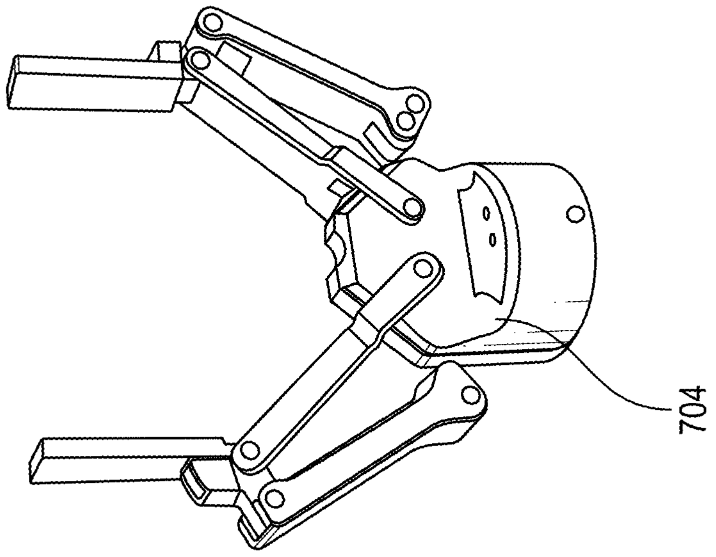
FIG. 8 is an image of a mechanical gripper mounted to the robot arm of FIG. 7 for grapping and moving the concrete cubes being processed or tested.
Figure 7:
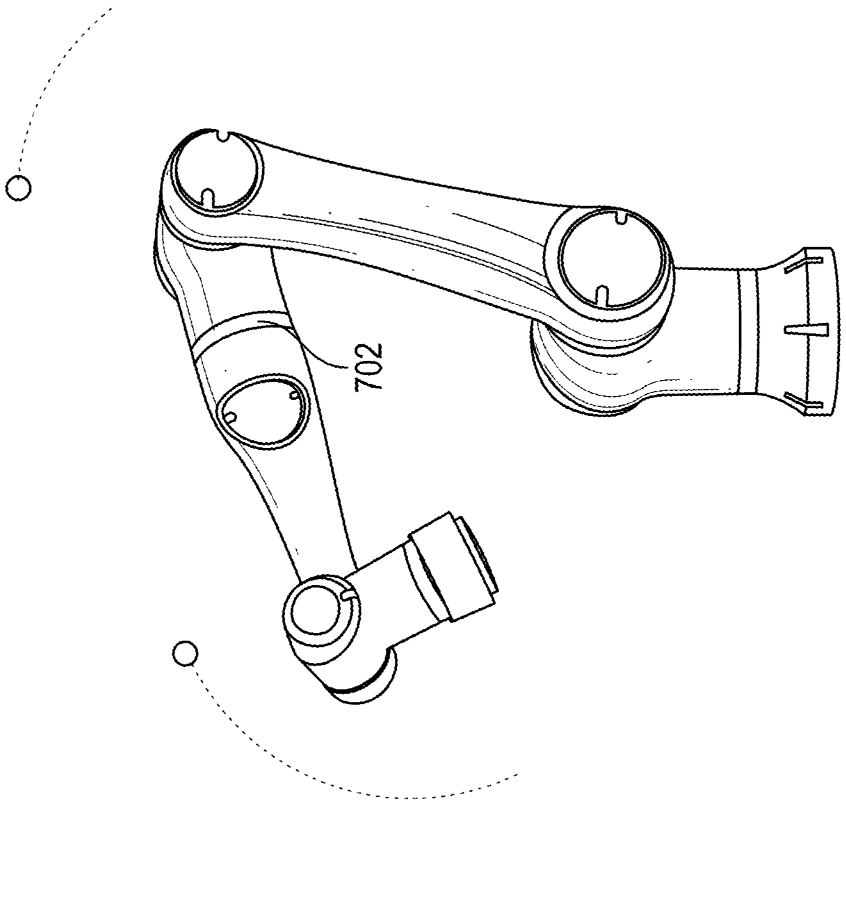
FIG. 7 is an image of a 6-axis robot arm of the transportation module of the automated concrete cube processing system of FIG. 2.

With reference to FIG. 6, the drying stage 204 comprises an air blower 602 arranged to facilitate removal of water from the plurality of concrete cubes 102 after the completion of curing process. For example, after the curing process, the concrete cubes 102 and the cube trays 302 may be transferred to the platform 604, and the air blower 602 may be used to dry the cured concrete blocks 102 for a predetermined period of time. Advantageously, weights of the concrete blocks may be more accurately measure after complete drying. It should be appreciated by a skilled person that other means for drying, such as baking or increasing temperature of the air blower may also be employed in other example implantations.

With reference to FIGS. 7 to 10, the transportation module further comprising a robotic arm 702 arranged to remove the plurality of concrete cubes 102 from a tray compartment in the cube tray 302, and to move the plurality of concrete cubes 102 among different stages. For example, after the concrete blocks 102 are blow-dried completely, the concrete blocks 102 held by the cube tray 302 are then ready for dimension and weight measurement.

In manual process, the concrete cubes are measured manually, for example, by using caliper for measuring the dimension of the blocks, one by one, and the weight is further measure by manually moving the blocks one by one on a digital balance. The measured dimension as well as the weight of each of the concrete block are also recorded manually.

Referring to FIGS. 7 to 10, the robotic arm 702 is mounted on a rail system 216 arranged to facilitate transportation of the concrete cube 102 held by the robotic arm 702 along a predetermined path among different stages, such as from the drying stage 204 to the measurement stage 206 after complete curing and drying of the concrete cubes 102. In addition, the robotic arm 702 and the rail system 216 may also cooperate to move the cubes 102 to later stages such as the compression stage 208 as well as the storage 214 after the complete curing and testing process.

Preferably, the robotic arm 702 includes 6-axis robot arm, and the robotic arm 702 comprises a mechanical gripper 704 arranged to selectively hold the plurality of concrete cubes 102, e.g. placed in different positions/compartments on the cube tray 302. For example, a heavy duty 6-axis robot arm may be used for lifting and manipulating a mass of up to 10 kg, and therefore may precisely pickup the concrete cube and move it to difference stages. The precision of the robot arm 702 and mechanical gripper 704 may have a 0.05 mm accuracy to achieve a reasonable repeatability. In addition, the robotic arm 702 and/or the mechanical gripper 704 may be waterproof and has an IP classification of at least IP 66 such that the robotic arm system may work in an environment built with a water tank.

Figure 10:
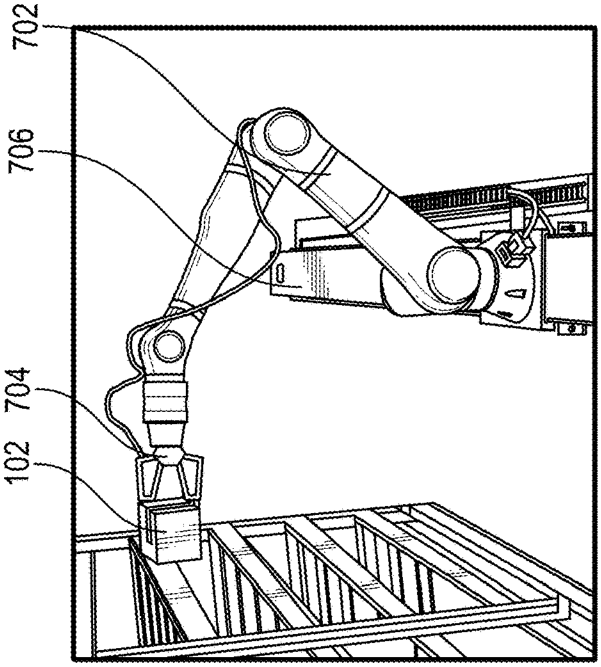
FIG. 10 is an image showing the robot arm of FIG. 7 and mechanical gripper of FIG. 8 cooperate to move a concrete cube.
Figure 9:
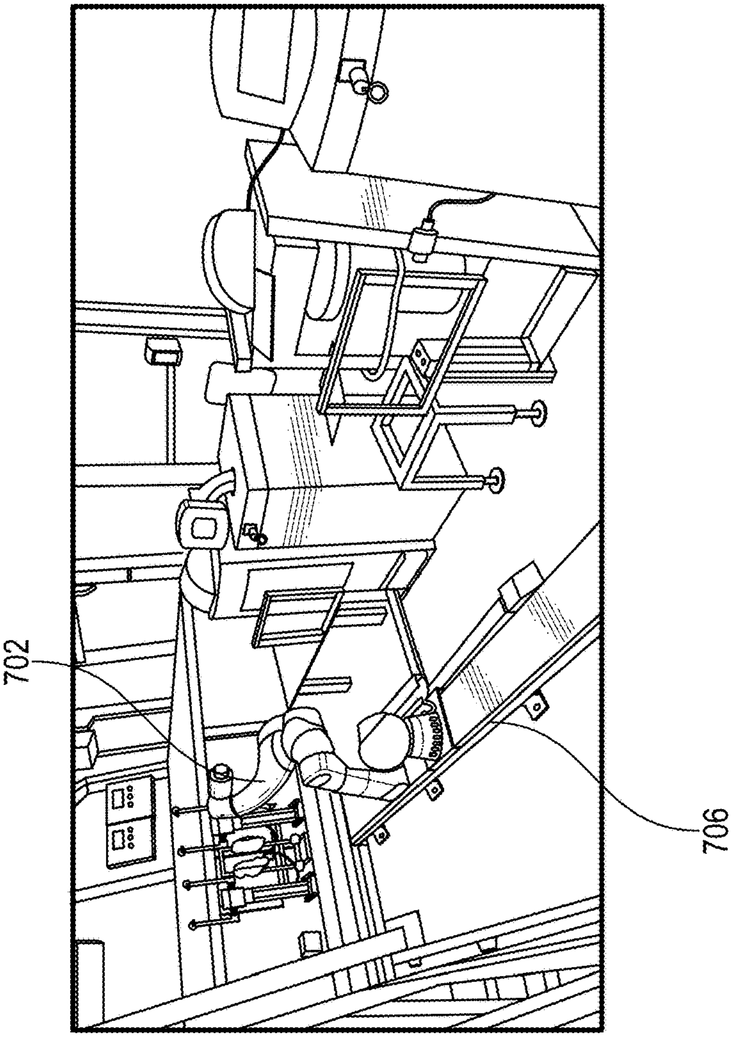
FIG. 9 is an image showing the robot arm of FIG. 7 being mounted on a linear rail arranged to move the concrete cubes among different stages.
Figure 11:
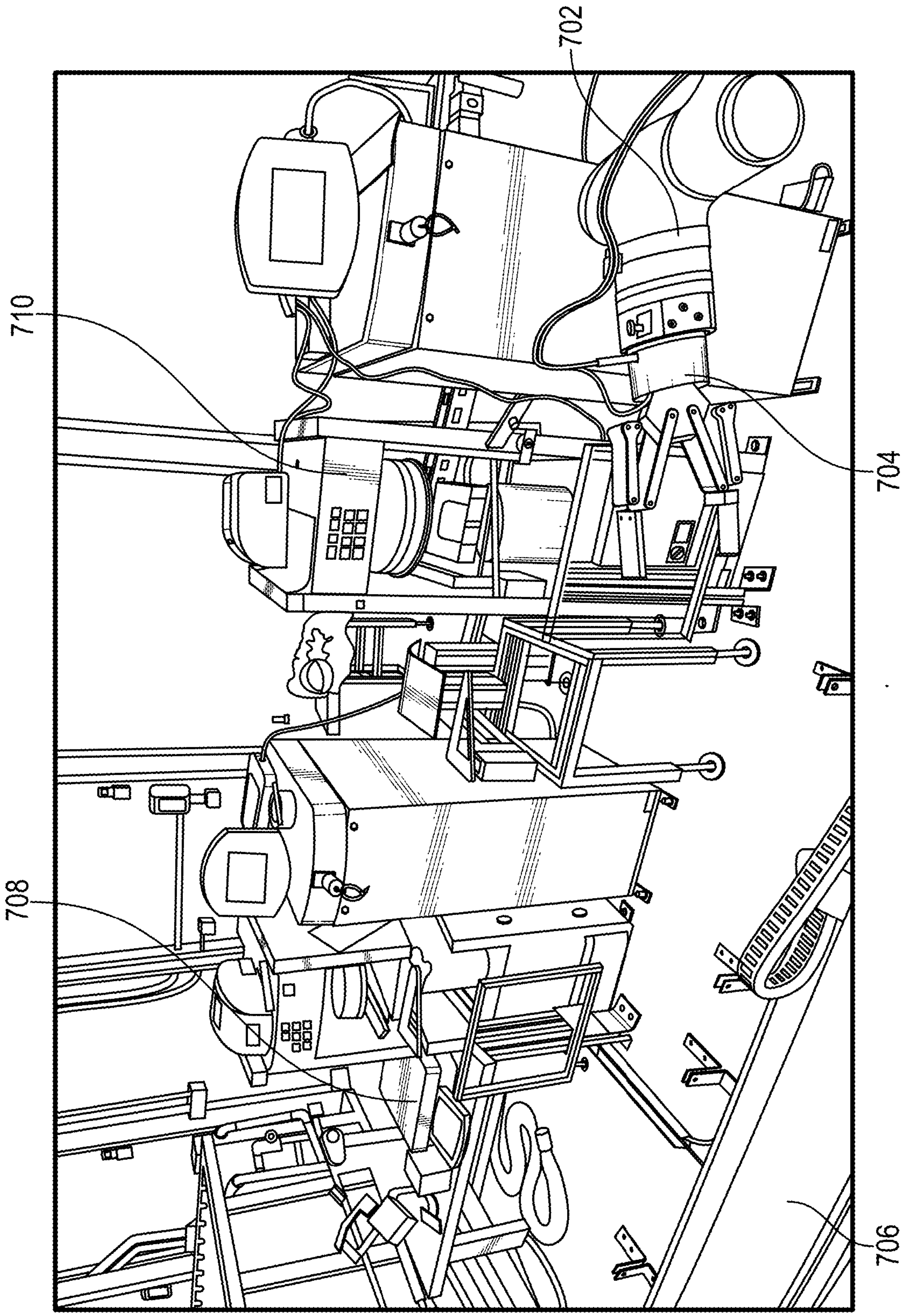
FIG. 11 is an image showing the concrete cube of FIG. 10 being positioned in a compressive stress tester of the automated concrete cube processing system of FIG. 2.

Referring to FIGS. 9 and 10, the robotic arm 702 is mounted on a linear rail system 706. Such a deployment with linear rail system 706 provides an extra flexibility for facilitating multiple action across widened coverage area, such as but not limited to: unloading concrete cubes 102 from holder/cube tray 302, placing the cubes on a weight and dimension tester 708, transferring the cubes into compression tester 710, and removing the tested cubes and placing the cubes onto the trolley or storage. For example, different stages such as the weight and dimension tester 708 and the compression tester 710 are place side by side and along the rail 706 and accordingly the robot arm 702 may move the concrete cube 102 to be tested from one stage to another.

Advantageously, by utilizing the robot arm 702, and the rail system 706, concrete cubes 102 may be automatically for testing and evaluation by different tester, thereby eliminating the need of manual process such as putting the cubes on a weight for measuring the dimension and weight of the cube, manually measuring the dimension of the cubes using a caliper and then manually moving the concrete cubes from the weight to the compressive tester. More preferably, the measurement stage 206 comprising a 3D measurement device arranged to measure the size of the concrete cube, as well as an electric weight scale arranged to measure the weight of the concrete cube, for measuring and recording the dimension and weight of the concrete cube in a single measurement stage 206. Alternatively, weight and dimension of a concrete cube may be measured in different stages or using multiple measurement devices in other embodiments.

After the dimension and weight of the concrete block has been measured, the concrete block may then be moved to the compression stage 208, in which a concrete testing machine may be provided for performing a compressive strength test on the concrete cube.

Figure 13:
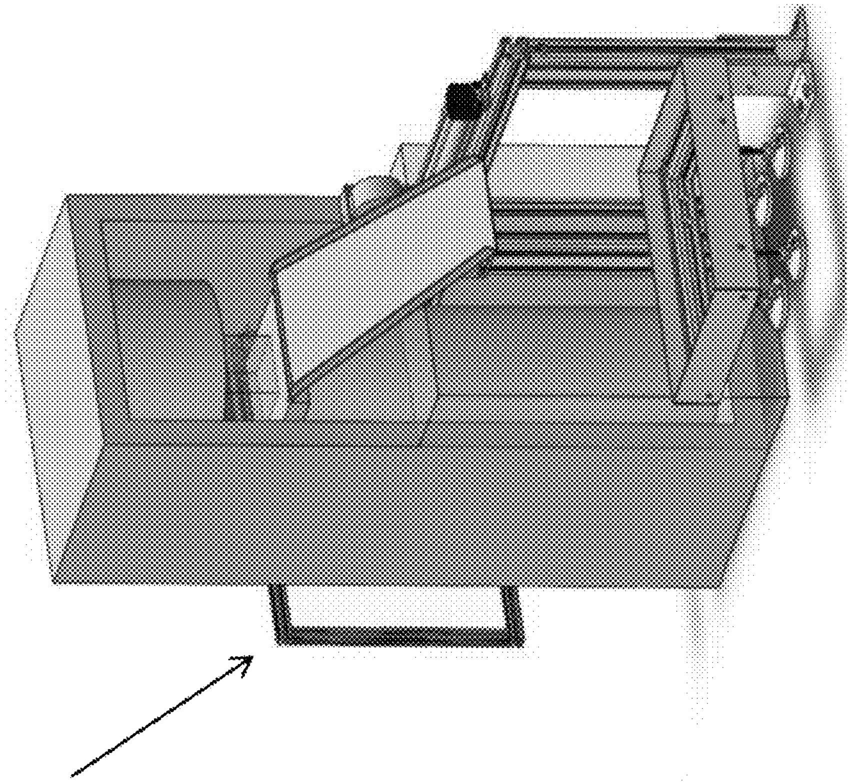
FIG. 13 is a rear-view illustration of the compressive stress tester of FIG. 11.
Figure 12:
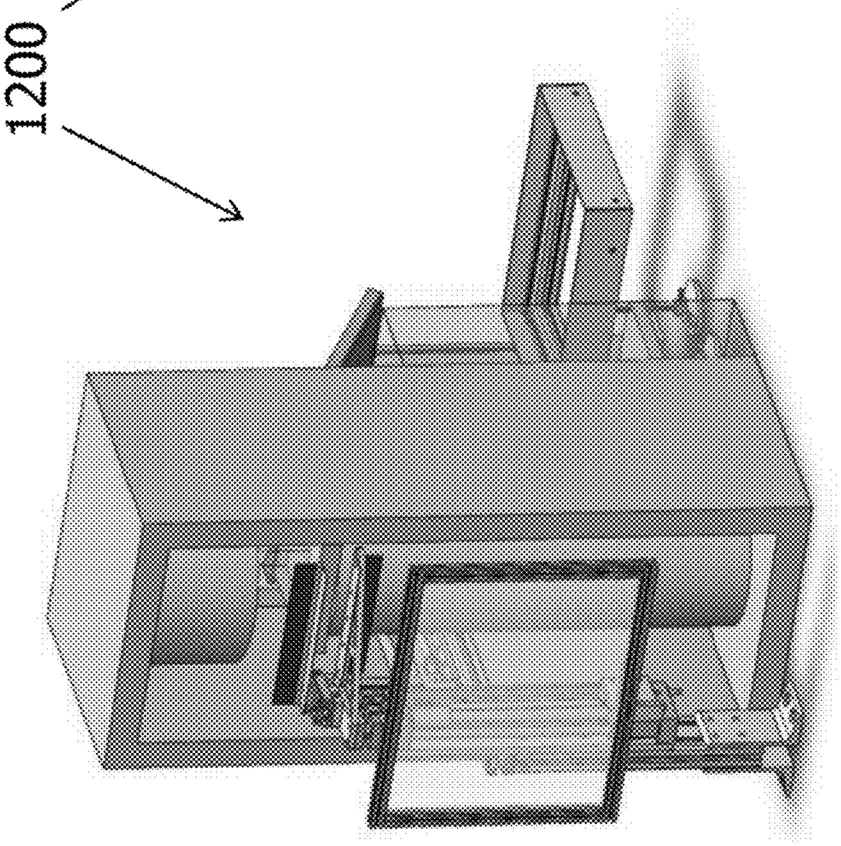
FIG. 12 is a front-view illustration of the compressive stress tester of FIG. 11.

With reference to FIGS. 12 and 13, in one preferred example, the concrete testing machine 1200 is a semi-custom compression test set, including an ELE concrete testing machine (2000 kN) which has been customize to work efficiently with robot arm operation. The concrete testing machine 1200 may be provided with a built-in camera for easy observation or monitoring of the compressive test. Optionally or additionally, the concrete testing machine 1200 may also be provided with an automatic cleaning function in the compression chamber of the testing machine 1200, such that dust or debris may be removed every time removal of the concrete cube after completion of the compression test.

Figure 14:
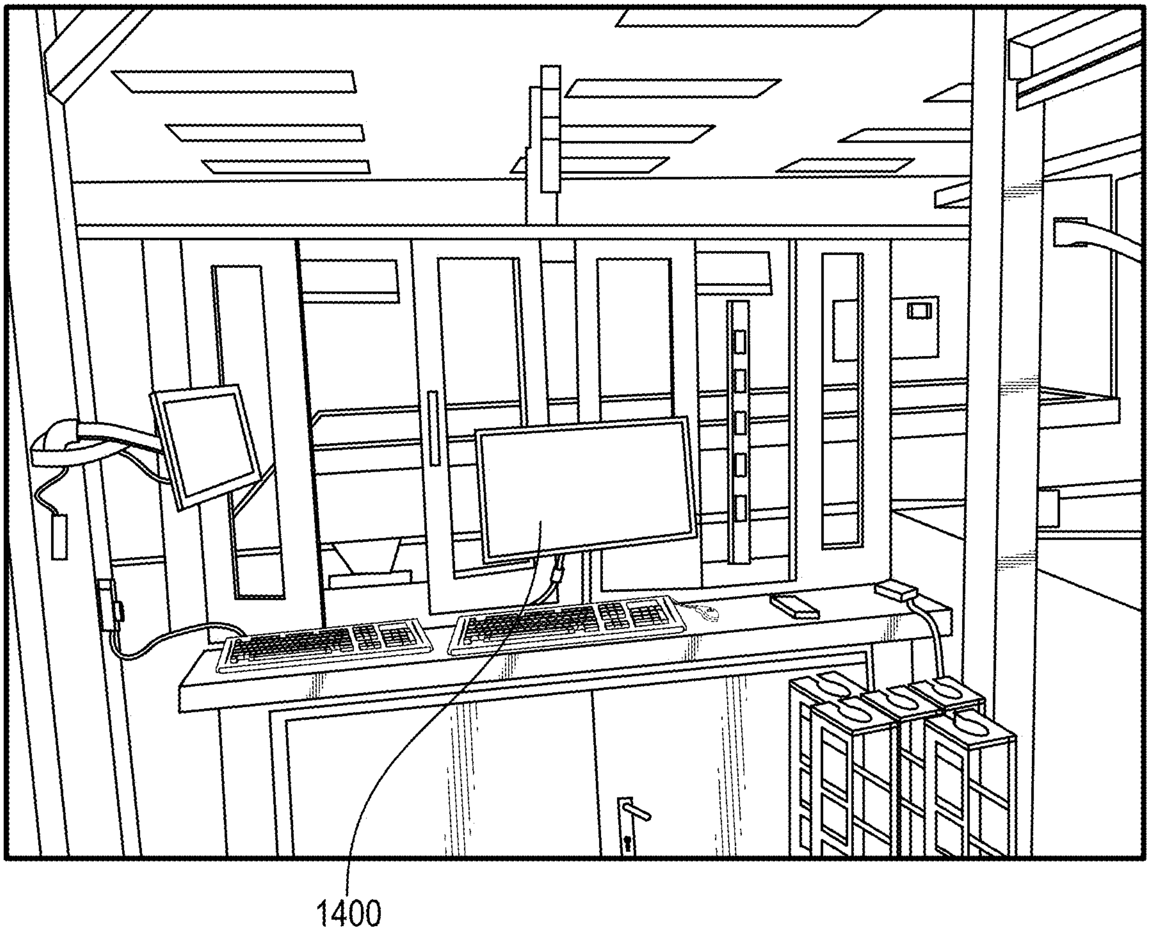
FIG. 14 is an image showing a PC server for controlling the automated concrete cube processing system of FIG. 2.

Preferably, the system 200 may further comprise a data storage arranged to store testing and measurement records associated with each of the plurality of concrete cubes being processed. Referring to FIG. 14, a computer server 1400 may be included to capture and store data obtained in different stages, therefore manual input of the test results are not necessary. In addition, the PC server may also be used for controlling and/or monitoring operation of different modules in the system 200.

In addition, the PC server may also be used to store and record the identify of each of the concrete blocks 102 being received by the input stage, for example the input stage of the system 200, referring to FIG. 2, may also comprise an RFID reader 218, such as a handheld RFID reader or an RFID reader mounted at a predetermined position at the input stage, for reading a tag, similar to the one as shown in FIG. 1, provided with an ID of the concrete cube 102 being processed.

Optionally or additionally, the system 200 may further comprise a concrete cube failure checking module, such as a deep-learning based concrete analyzer, arranged to detect a defect in the plurality of concrete cubes being processed. For example, the deep-learning based concrete analyzer may be integrated in the compression testing machine or as a separate testing stage so as to predict the any mechanical failure in the concrete structure according to the compressive testing results obtained, and/or the dimension/weight data obtained in previous stages.

In one preferred embodiment, the system may have the following system specifications:

Compliant to CS1:2010 and CS1:1990 standard

In total two cube storage space of Water Tank—500 metal cube holder on each tank, i.e. total 1000 cube holder storage, or total 6000 cubes storage (each cube holder can store 6 cubes)

Through put per hour—20 cubes per hour

These embodiments may be advantageous in that, an automated concrete cube processing system is provided. The system is provided with an auto concrete cube dimension and weight measurement system, an auto water tank load and unload system, an auto concrete cube Pressure Testing system and an auto concrete cube transfer system. Advantageously, the system may efficiently and automatically cure and evaluate the concrete cube testing samples with a high throughput.

Although not required, the embodiments described with reference to the figures can be implemented as an application programming interface (API) or as a series of libraries for use by a developer or can be included within another software application, such as a terminal or personal computer operating system or a portable computing device operating system. Generally, as program modules include routines, programs, objects, components and data files assisting in the performance of particular functions, the skilled person will understand that the functionality of the software application may be distributed across a number of routines, objects or components to achieve the same functionality desired herein.

It will also be appreciated that where the methods and systems of the present invention are either wholly implemented by computing system or partly implemented by computing systems then any appropriate computing system architecture may be utilized. This will include tablet computers, wearable devices, smart phones, Internet of Things (IoT) devices, edge computing devices, stand alone computers, network computers, cloud-based computing devices and dedicated hardware devices. Where the terms "computing system" and "computing device" are used, these terms are intended to cover any appropriate arrangement of computer hardware capable of implementing the function described.

It will be appreciated by persons skilled in the art that numerous variations and/or modifications may be made to the invention as shown in the specific embodiments without departing from the spirit or scope of the invention as broadly described. The present embodiments are, therefore, to be considered in all respects as illustrative and not restrictive.

Any reference to prior art contained herein is not to be taken as an admission that the information is common general knowledge, unless otherwise indicated.

The invention claimed is:

1. An automated system processing standardized concrete test cubes to determine matrial properties threof, the system comprising:

a curing stage including a water tank arranged to facilitate submerging and batch curing of a plurality of concrete cubes for a predetermined period of time;

a drying stage arranged to facilitate drying of the plurality of concrete cubes upon completion of curing process, wherein the drying stage comprises an air blower arranged to facilitate removal of water from the plurality of concrete cubes after the completion of curing process;

a measurement stage arranged to facilitate automated measurement of dimensions and a weight of each of the plurality of concrete cubes after drying, wherein the measurement stage comprising a 3D measurement device arranged to measure the size of the concrete cube and/or an electric weight scale arranged to measure the weight of the concrete cube;

a compression stage including a concrete testing machine arranged to perform a stadardized compressive strength test on each of the plurality of concrete cubes to determine a material strength property; and a transportation module including a plurality of cube trays each arranged to hold a plurality of concrete cubes for batch processing of the concrete cubes in the curing state, an automatic precision hanger arranged to move the plurality of cube trays and thus the plurality of concrete cubes in the curing stage, and a robotic arm arranged to transfer the plurality of concrete cubes among the curing state, the drying state, the measurement stage and the compression stage.

2. The automated concrete cube processing system in accordance with claim 1, wherein the plurality of concrete cubes are made on-site at a construction site and without completing the curing process at the construction site.

3. The automated concrete cube processing system in accordance with claim 1, wherein the plurality of cube trays are arranged in a two-dimensional array in the water tank to facilitate batch processing of the concrete cubes in the curing stage.

4. The automated concrete cube processing system in accordance with claim 3, wherein the automatic precision hanger is arranged to move the plurality of cube trays to a predetermined position in the two-dimensional array.

5. The automated concrete cube processing system in accordance with claim 1, wherein the transportation module further comprising a plurality of anchoring heads each provided with an anchoring mechanism arranged to selectively hold a respective cube tray during transportation of the plurality of concrete cubes.

6. The automated concrete cube processing system in accordance with claim 5, wherein the plurality of anchoring heads are arranged to work under water.

7. The automated concrete cube processing system in accordance with claim 1, wherein the plurality of cube trays are made of stainless steel.

8. The automated concrete cube processing system in accordance with claim 1, wherein the robotic arm is arranged to remove the plurality of concrete cubes from a tray compartment in the cube tray, and to move the plurality of concrete cubes among the curing stage, the drying stage, the measurement stage and the compression stages.

9. The automated concrete cube processing system in accordance with claim 8, wherein the robotic arm includes 6-axis robot arm.

10. The automated concrete cube processing system in accordance with claim 8, wherein the robotic arm is mounted on a rail system arranged to facilitate transportation of the concrete cube held by the robotic arm along a predetermined path among different stages.

11. The automated concrete cube processing system in accordance with claim 8, wherein the robotic arm comprises a mechanical gripper arranged to selectively hold the plurality of concrete cubes.

12. The automated concrete cube processing system in accordance with claim 1, further comprising a data storage arranged to store testing and measurement records associated with each of the plurality of concrete cubes being processed.

13. The automated concrete cube processing system in accordance with claim 1, further comprising an input stage arranged to receive the plurality of concrete cubes being processed.

14. The automated concrete cube processing system in accordance with claim 13, wherein the input stage comprising an RFID reader arranged to read a tag provided with an ID of the concrete cube being processed.

15. The automated concrete cube processing system in accordance with claim 1, further comprising a concrete cube failure checking module arranged to detect a defect in the plurality of concrete cubes being processed.

16. The automated concrete cube processing system in accordance with claim 15, wherein the concrete cube failure checking module includes a deep-learning based concrete analyzer.

* * * * *